United States Patent
Levy et al.

(10) Patent No.: US 11,212,590 B2
(45) Date of Patent: Dec. 28, 2021

(54) MULTIPLE CORE SOFTWARE FORWARDING

(71) Applicant: Harmonic, Inc., San Jose, CA (US)

(72) Inventors: Adam Levy, Hadera (IL); Pavlo Shcherbyna, Santa Clara, CA (US); Alex Muller, Pardes Hanna Karkur (IL); Vladyslav Buslov, Kiev (UA); Victoria Sinitsky, Haifa (IL); Michael W. Patrick, Assonet, MA (US); Nitin Sasi Kumar, San Ramon, CA (US)

(73) Assignee: Harmonic, Inc., San Jose, CA (US)

(*) Notice: Subject to any disclaimer, the term of this patent is extended or adjusted under 35 U.S.C. 154(b) by 644 days.

(21) Appl. No.: 15/644,823

(22) Filed: Jul. 10, 2017

(65) Prior Publication Data
US 2018/0014081 A1    Jan. 11, 2018

Related U.S. Application Data

(60) Provisional application No. 62/360,848, filed on Jul. 11, 2016.

(51) Int. Cl.
| | |
|---|---|
| *H04N 21/61* | (2011.01) |
| *H04L 29/06* | (2006.01) |
| *H04B 1/707* | (2011.01) |
| *H04L 29/08* | (2006.01) |

(52) U.S. Cl.
CPC ..... *H04N 21/6118* (2013.01); *H04L 67/1038* (2013.01); *H04N 21/6168* (2013.01); *H04B 1/707* (2013.01); *H04L 65/4076* (2013.01)

(58) Field of Classification Search
CPC ............ H04N 21/6118; H04N 21/6168; H04L 67/1038
See application file for complete search history.

(56) References Cited

U.S. PATENT DOCUMENTS

| | | | |
|---|---|---|---|
| 8,397,238 B2 * | 3/2013 | Venkumahanti ... | G01R 1/07378 712/214 |
| 9,258,237 B1 * | 2/2016 | Smith ................. | H04L 12/4633 |
| 9,465,619 B1 * | 10/2016 | Rottenstreich ........ | G06F 9/3836 |
| 2009/0285233 A1 | 11/2009 | Al-Banna | |

(Continued)

FOREIGN PATENT DOCUMENTS

KR    10-0652017 B1    11/2006

OTHER PUBLICATIONS

International Search Report and Written Opinion of the International Searching Authority dated Oct. 19, 2017 in International Application No. PCT/US17/41285.

*Primary Examiner* — Yemane Mesfin
*Assistant Examiner* — Henry Baron
(74) *Attorney, Agent, or Firm* — Brokaw Patent Law PC; Christopher J. Brokaw (57) ABSTRACT

Approaches for performing all DOCSIS downstream and upstream data forwarding functions using executable software. DOCSIS data forwarding functions may be performed by classifying one or more packets, of a plurality of received packets, to a particular DOCSIS system component, and then processing the one or more packets classified to the same DOCSIS system component on a single CPU core. The one or more packets may be forwarded between a sequence of one or more software stages. The software stages may each be configured to execute on separate logical cores or on a single logical core.

20 Claims, 4 Drawing Sheets

(56) References Cited

U.S. PATENT DOCUMENTS

| | | |
|---|---|---|
| 2010/0005500 A1 | 1/2010 | Cloonan et al. |
| 2011/0099393 A1 | 4/2011 | Tran |
| 2011/0185263 A1 | 7/2011 | Chapman et al. |
| 2011/0302416 A1* | 12/2011 | Hoshen ............... H04L 63/0428 713/168 |
| 2013/0128885 A1* | 5/2013 | Kardashov .......... H04L 45/7453 370/389 |
| 2014/0317450 A1* | 10/2014 | Hess ................... G06F 11/3684 714/38.1 |
| 2015/0092531 A1 | 4/2015 | Bernstein et al. |

\* cited by examiner

MULTIPLE CORE SOFTWARE FORWARDING

CLAIM OF PRIORITY

This application claims priority to U.S. provisional patent application Ser. No. 62/360,848, filed Jul. 11, 2016, entitled "Multiple Core Software Forwarding," the contents of which are hereby incorporated by reference for all purposes as if fully set forth herein.

FIELD OF THE INVENTION

Embodiments of the invention relate to performing all DOCSIS downstream and upstream data forwarding functions using executable software.

BACKGROUND

A Converged Cable Access Platform (CCAP) is a Cable-Labs-led effort that brings technical and operational unity to two projects: The Converged Multiservice Access Platform (CMAP), headed up by Comcast Corp, and Converged Edge Services Access Router (CESAR), headed up by Time Warner Cable Inc.

Data Over Cable Service Interface Specification (DOCSIS) is a telecommunications standard used to provide Internet access via a cable modem.

Currently, industry practice is to implement downstream forwarding in a CCAP environment in hardware such as Ternary Content-Addressable Memory (TCAMs) for classification and Field-Programmable Gate Arrays (FPGAs) for packet scheduling and replication.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for performing all DOCSIS downstream and upstream data forwarding functions using executable software are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

A virtual Converged Cable Access Platform (CCAP) is software that performs the functions of a hardware-based CCAP. The virtual CCAP may execute on hardware components that include a commercial off-the-shelf switch/router and one or more off-the-shelf computing servers. A commercial example of a virtual CCAP is CableOS, available from Harmonic, Inc. of San Jose, Calif.

Embodiments of the invention for a software-based CCAP environment which may rapidly add new features, e.g. the introduction of High/Low priority data rings.

Embodiments of the invention are directed towards dividing the functions of DOCSIS downstream MAC Layer forwarding among multiple software cores of a commercial off-the-shelf switch/router (terms a 'Core Routing Engine component' or CRE in certain embodiments) of a virtual CCAP. Certain embodiments make use of the Data Path Development Kit (DPDK), which features zero-locking rings between cores. Such zero-locking rings contain pointers to shared DPDK Message Buffers or "MBUFs". Each MBUF comprises a header that contains DPDK MBUF library information as well a structure between the end of the MBUF header and the start of packet data called the MBUF "headroom." Embodiments call for storing information useful for DOCSIS forwarding in the MBUF headroom.

Embodiments of the invention use DPDK "Single Producer Single Consumer" rings to avoid thread synchronization between multiple producers or multiple consumers. Each thread repeatedly checks for the availability of any packets on each of the rings it receives.

Figure 1:
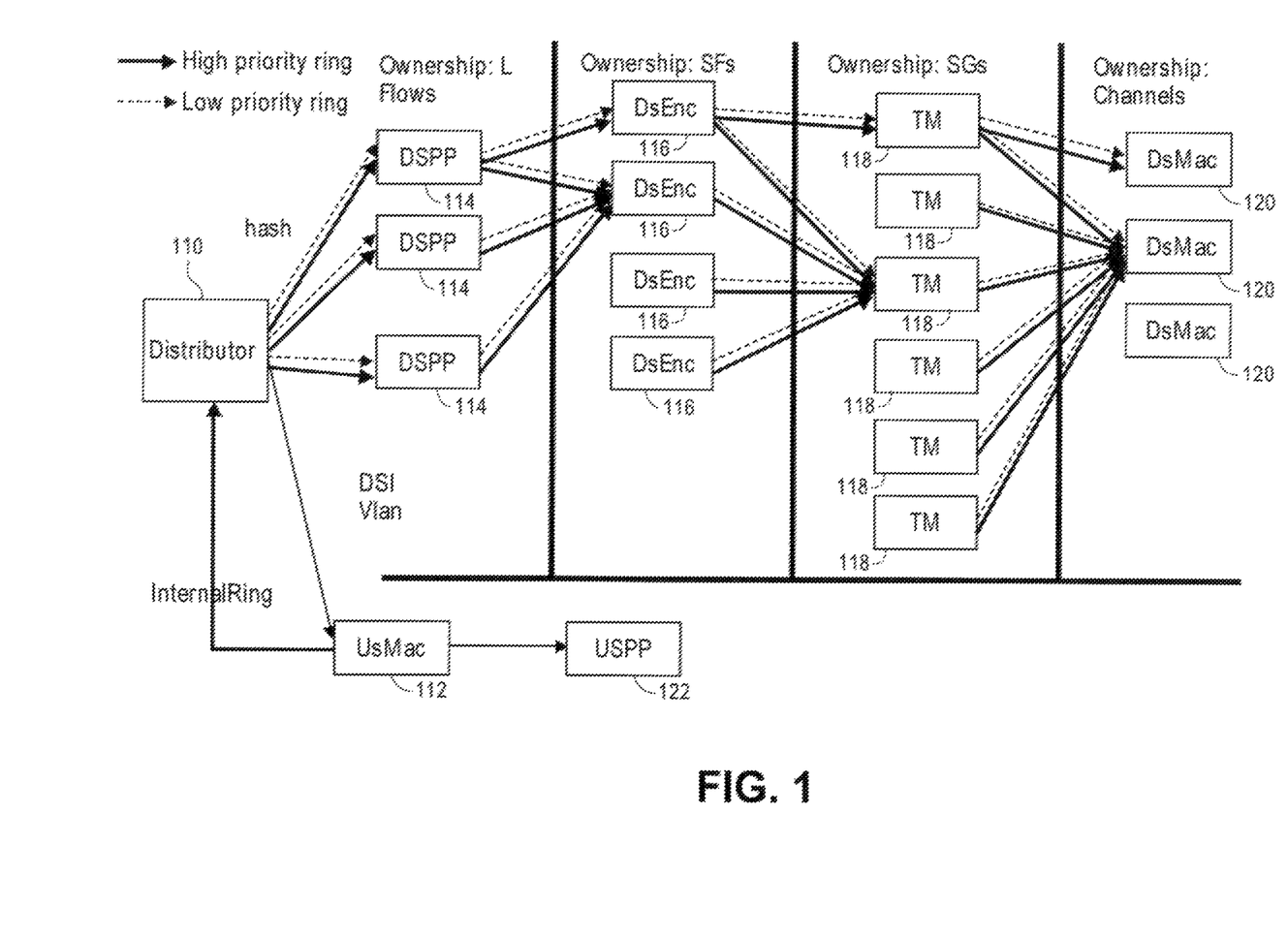
FIG. 1 is an illustration of DOCSIS downstream and upstream forwarding in accordance with an embodiment of the invention.

FIG. 1 is an illustration of DOCSIS downstream forwarding in accordance with an embodiment of the invention. Distributor thread 110 of FIG. 1 is a thread which is responsible for receiving all incoming physical packets from the trunk Ethernet port connected to a commercial off-the-shelf switch/router (which in an embodiment may correspond to a Core Routing Engine (CRE)). The incoming physical packets received by distributor thread 110 include downstream packets carried by the Internet as well as upstream packets tunneled from a Remote Phy Device (RPD).

While embodiments of the invention may chiefly be described in terms of distributor thread 110 being implemented by software, note that other embodiments of the invention may perform the functions of distributor thread 110 in hardware. For example, certain embodiments may employ a network card (NIC) which performs the functions attributed to distributor thread 110. Such an embodiment may include a distributor component, which is a hardware device, such as but not limited to a NIC, which is configured to perform the functions attributed to distributor thread 110 as discussed herein. Other embodiments of the invention may employ a distributor component which performs the functions attributed to distributor thread 110 as discussed herein partially in a hardware component and partially in software.

Upstream packets may be encapsulated in the L2TPv3 protocol and are addressed to an L2TPv3 Logical Control Connection Entity (LCCE) that is implemented on commercial off-the-shelf switch/router (e.g., a Core Router Engine (CRE) in an embodiment). An embodiment of this invention assigns a locally administered MAC address to the LCCE of the form 02:xx:xx:xx:xx:xx so that distributor thread 110 can rapidly detect a tunneled L2TPv3 packet and forward that packet to UsMac thread 112 which performs upstream processing. Distributor thread 110 forwards all other received packets to one of a plurality of DSPP threads 114, which are threads that are responsible for downstream processing. To do so, distributor thread 110 may hash the source and destination MAC and/or IP addresses to balance load among the DSPP threads 114.

Execution Environments

Prior to discussing the operation of downstream and upstream data flows, it will be helpful to appreciate the relationship between operational stages depicted by FIG. 1 and logical cores. The operational stages shown in FIG. 1 correspond to the distributor stage (corresponding to the distributor component), the "Downstream Packet Processor" (DSPP) stage (corresponding to the plurality of DSPP threads 114), the "Downstream Encryption" (DsEnc) stage (corresponding to the plurality of DsEnc threads 116), the "Traffic Manager" (TM) stage (corresponding to the plurality of TM threads 118), the "Downstream Medium Access Control" (DsMac) stage (corresponding to the plurality of DsMac threads 120), the "Upstream Medium Access Control" (UsMac) stage (corresponding to UsMac thread 112), and the "Upstream Packet Processor" (USPP) stage (correspond to UsMac component). The functional components within each of these stages shall be discussed in greater detail below. As used herein, a logical core includes a physical CPU core, such as Intel®'s Hyper-Threading Technology, or a virtual CPU core.

In certain embodiments of the invention, each operational stage depicted in FIG. 1 may execute on separate logical cores. In other embodiments of the invention, two or more operational stages depicted in FIG. 1 may execute on a single logical core.

In yet other embodiments of the invention, all operational stages depicted in FIG. 1 may execute on a single logical core, with either manually-scheduled (e.g. round-robin) or time-sliced concurrent scheduling of the stages on the single core. Further embodiments of the invention may allow for a user to configure which logical core should execute each operational stage without limitation such that the user can configure a single logical core to execute all operational stages or a plurality of logical cores to each execute a different operational stage, for example.

Downstream Data Flows

Figure 2:
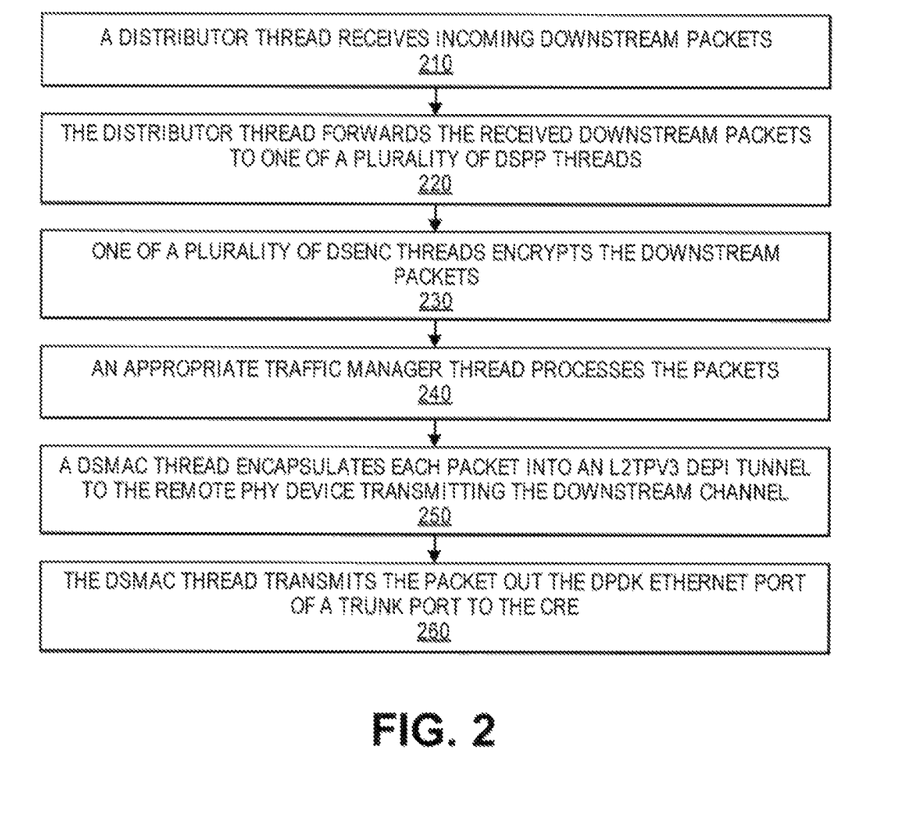
FIG. 2 is a flowchart illustrating the functional steps of DOCSIS downstream forwarding in accordance with an embodiment of the invention.

FIG. 2 is a flowchart illustrating the functional steps of DOCSIS downstream forwarding in accordance with an embodiment of the invention. The steps of FIG. 2 shall be explained below with reference to FIG. 1.

In step 210, distributor thread 110 receives incoming downstream physical packets, e.g., packets carried by the Internet.

Thereafter, in step 220, distributor thread 110 forwards the received downstream packets to one of a plurality of DSPP threads 114. A DSPP thread 114 is responsible for classifying a downstream packet to a DOCSIS service flow. All DSPP threads 114 have access to the same database of downstream classifiers. A DSPP thread 114 classifies a packet using an internal index called the Traffic Manager Flow Index or TmFlowIndex. All DSPP threads 114 and all TM threads 118 use the same TmFlowIndex A DSPP thread 114 stores the TmFlowIndex to which it classified the packet into MBUF headroom field.

In DOCSIS, every downstream service flow belongs to a single DOCSIS "MAC-Domain", which is identified by embodiments of the invention by a MAC Domain ID. DSPP thread 114 also stores the MAC Domain ID of a packet's service flow in the MBUF headroom. DOCSIS also defines the concept of a "MAC-Domain downstream service group" (MD-DSSG) which comprises the set of downstream channels in a MAC-Domain that reach a single CM. DSPP thread 114 of an embodiment places into an MBUF headroom a system-unique identifier of the MD-DSSG which contains the packet's service flow. The MAC-Domain ID or MD-DSSG identifier are used to select to which TM thread DSENC forwards a downstream packet it receives from DSPP thread 114.

In step 230, one of a plurality of DsEnc threads 116 encrypts the downstream packets. To do so, a particular DsEnc thread 116 may encrypt a downstream packet by using a shared hardware component such as the Intel® QuickAssist module. Multiple DsEnc threads 116 may share only one or two hardware modules, e.g. one or two per commercial off-the-shelf switch/router (which may be termed a 'Core Server' or CS in an embodiment). Accordingly, the queuing delay to the shared encrypting mechanism may be variable. In order to reduce the variability in delay of outgoing packets after an aggregate rate limiting function of the Traffic Manager, encryption by DsEnc thread 116 is performed before Traffic Management scheduling. Embodiments of the invention advantageously perform encryption before the scheduling of packets. Current industry CMTS implementations schedule packets and then perform encryption afterwards in commercial DOCSIS chips, such as but not limited to Broadcom Corporation's BCM3215 chip, which performs the downstream Media Access Control (MAC) functions.

In order to reduce the incidence of cache misses in DsEnc threads 116, each DOCSIS service flow is assigned to a single DsEnc thread 116. Thus, the keying information and statistics for a service flow are kept in only one Dspp core L1 cache. The corresponding DSPP-to-DsEnc ring for each Dspp thread 114 is communicated to a Dspp thread 114 when a service flow is added.

In an embodiment, the functionality described above with respect to the plurality of DsEnc threads may be implemented, at least partially, in hardware rather than exclusively by software. In such an embodiment, the functionality described herein as being attributed to or performed by plurality of DsEnc threads 116 may be performed by one or more DsEnc hardware components, which may correspond to a hardware card that accelerates the operations of encrypting downstream packets. As used herein, the term 'DsEnc component' includes both a software implementation, a hardware implementation, and an implementation involving both hardware and software. While embodiments shall chiefly be described in terms of DsEnc threads 116 being implemented in software, it shall be understood to those in the art that other embodiments may be employed where DsEnc threads 116 are implemented partially or wholly by hardware.

Thereafter, in step 240, an appropriate TM thread 118 processes the packet. Each DOCSIS MAC Domain is assigned to a single Traffic Manager (TM) thread 118. A TM thread 118 enqueues packets on a per-flow queue and schedules packets for transmission using a multiple-level hierarchical packet scheduler. Each Service Flow (SF), and hence each TmFlowIndex, belongs to a single MAC Domain. When the control plane adds a new TmFlowIndex to a DsEnc thread 116, the control plane also provides a pointer to the proper DsEnc-to-TM ring to reach the TM thread 118 assigned to the service flows MAC Domain.

Embodiments of the invention call for the assignment of MAC Domains to a TM thread 118. This is because most MAC Domains consist of highly overlapping Downstream Channel Sets (DCS) with shared downstream channels. Keeping all scheduling of DCSs that share the same channel in the same channel set avoids inter-core concurrent access to memory data structures. A TM thread 118 schedules each packet to a particular downstream RF channel.

If a MAC Domain is composed of disjoint (i.e. non-overlapping) downstream service groups (SGs), then embodiments may assign the disjoint sets of SGs to different TM threads 118 and still avoid inter-core co-ordination of per-packet scheduling information.

In step 250, a DsMac thread 120 encapsulates a packet into an L2TPv3 DEPI tunnel to the Remote Phy Device (RPD) transmitting the downstream channel. Each downstream channel is assigned to a single DsMac thread 120. A single DsMac thread 120 may be used for each channel to maintain single-core operation of per-packet sequence numbers. Such per-packet sequence numbers include an MPEG sequence number or a Packet Streaming Protocol (PSP) sequence number.

After encapsulating a packet, in step 260, the DsMac thread 120 transmits the packet out the DPDK Ethernet port of a trunk port to the CRE.

Advantageously, distributor thread 110, the plurality of DSPP threads 114, the plurality of DsEnc threads 116, the plurality of TM threads 118, and the plurality of DsMac threads 120 all share the same multi-core CPU and the same hardware bus of chip signals from CPU to memory.

Upstream Data Flows

Figure 3:
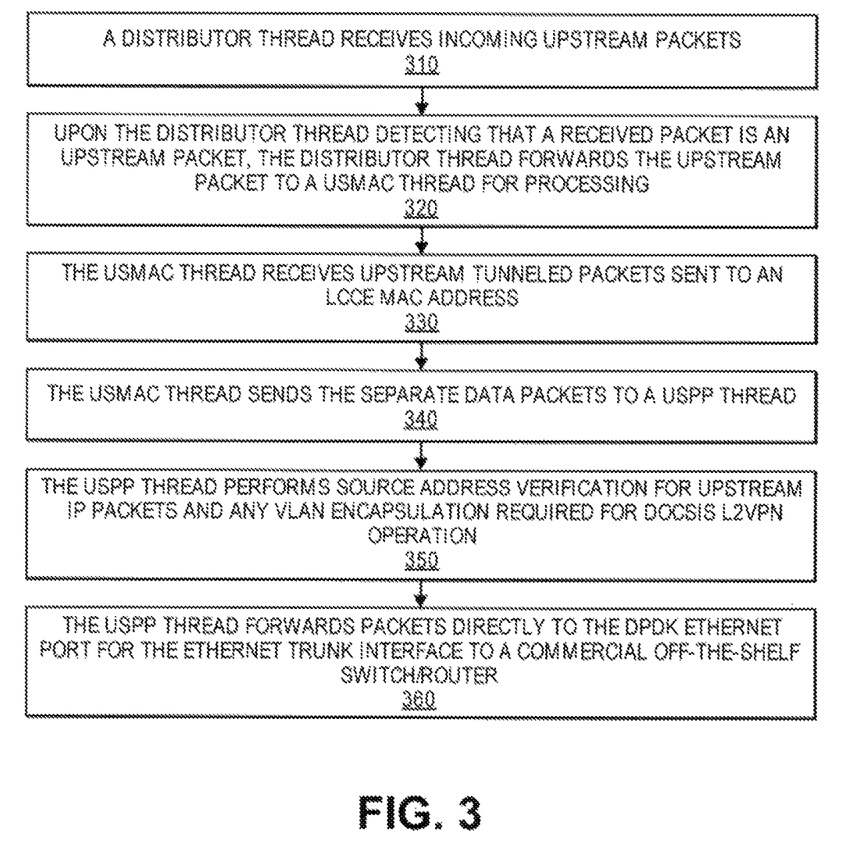
FIG. 3 is a flowchart illustrating the functional steps of DOCSIS upstream forwarding in accordance with an embodiment of the invention.

FIG. 3 is a flowchart illustrating the functional steps of DOCSIS upstream forwarding in accordance with an embodiment of the invention. The steps of FIG. 3 shall be explained below with reference to FIG. 1.

In step 310, distributor thread 110 receives incoming upstream packets, e.g., packets tunneled from a Remote Phy Device (RPD).

In step 320, upon distributor thread 110 detecting that a received packet is an upstream packet, distributor thread 110 forwards the upstream packet to UsMac thread 112 for processing. Upstream packets may be encapsulated in the L2TPv3 protocol and are addressed to an L2TPv3 Logical Control Connection Entity (LCCE) that is implemented on commercial off-the-shelf switch/router (e.g., a Core Routing Engine (CRE) in an embodiment). An embodiment of this invention assigns a locally administered MAC address to the LCCE of the form 02:xx:xx:xx:xx:xx so that distributor thread 110 can rapidly detect a tunneled L2TPv3 packet and forward that packet to UsMac thread 112 which performs upstream processing.

In step 330, UsMac thread 112 receives upstream tunneled packets sent to an LCCE MAC Address. UsMac thread 112 reassembles the sequences of upstream bursts from each upstream channel and separates the bursts into separate upstream packets, each in their own MBUF.

Thereafter, in step 340, UsMac thread 112 sends the separate data packets to a USPP thread 122. UsMac thread 112 separately recognizes upstream Bandwidth Request Mac Management Messages (MMMs) and forwards them to a scheduling software application (not shown) for upstream DOCSIS scheduling. UsMac thread 112 also recognizes other upstream MAC management messages and forwards them to a DOCSIS protocol software process for handling.

In step 350, USPP thread 122 performs Source Address Verification for upstream IP packets and any VLAN encapsulation required for DOCSIS L2VPN operation.

In an embodiment, the functionality described above with respect to USPP thread 122 may be implemented, at least partially, in hardware rather than exclusively by software. In such an embodiment, the functionality described herein as being attributed to or performed by USPP thread 122 may be performed by one or more USPP hardware components, which may correspond to a hardware card that accelerates the operation of encrypting upstream packets. As used herein, the term 'USPP component' and 'USPP stage' includes both a software implementation, a hardware implementation, and an implementation involving both hardware and software. While embodiments shall chiefly be described in terms of USPP thread 122 being implemented in software, it shall be understood to those in the art that other embodiments may be employed where USPP thread 122 is implemented partially or wholly by hardware.

In step 260, USPP thread 122 forwards packets directly to the DPDK Ethernet port for the Ethernet trunk interface to a commercial off-the-shelf switch/router (which may be a CRE in an embodiment).

Multiple pairs of UsMac thread 122/USPP thread 122 may be created, in which case an LCCE IP address is advantageously assigned to a single UsMac thread 112 and distributor thread 110 forwards upstream packets to the appropriate UsMac thread 122/USPP thread 122 pair based on the destination LCCE IP address, which avoids duplicating upstream per-CM Source Address Verification information and per-service-flow statistic information between cores, thereby reducing the probability of L1 cache misses. The assignment by embodiments of certain DOCSIS components to a particular instance of a processing stage on a CPU core is unique and represents an inventive leap to the CMTS industry. The usual software industry mechanism for dividing work among multiple CPU cores is with symmetric multiprocessing and load balancing among the cores, with little or no knowledge of the application domain of the software processes. Examples of assignment of DOCSIS components to processing stages include: assigning a DOCSIS service flow to one DSENC stage, assigning a DOCSIS MAC Domain or MAC Domain downstream service group to one TM stage, assigning a DOCSIS downstream channel to one DSMAC stage, assigning a DOCSIS LCCE to one US MAC stage, and assigning a DOSCIS service flow to one USPP stage.

High and Low Priority Rings

During high capacity operation, any thread instance may become too busy to keep up with incoming packets, which may cause congestion and eventual data loss of MBUFs on the rings going into those thread instances. Certain embodiments may employ data rings of varying degrees of priority so that lower priority traffic becomes congested and suffers drops before higher priority rings. Embodiments may employ data rings of any number of degrees of priority, e.g., two degrees may exist so that data rings may only be assigned a 'high' or 'low' priority, or three or more degrees may exist so that any level of granularity may be used to order data rings based on priority.

High priority rings may be advantageously used for certain classes of traffic. For example, in an embodiment, in decreasing order of priority, high priority rings are advantageously used for the following classes of traffic: Downstream DOCSIS maps and UCDs, Upstream Bandwidth Requests, Downstream and Upstream Voice payload, and finally all other DOCSIS Mac Management Messages.

Implementing Hardware

Figure 4:
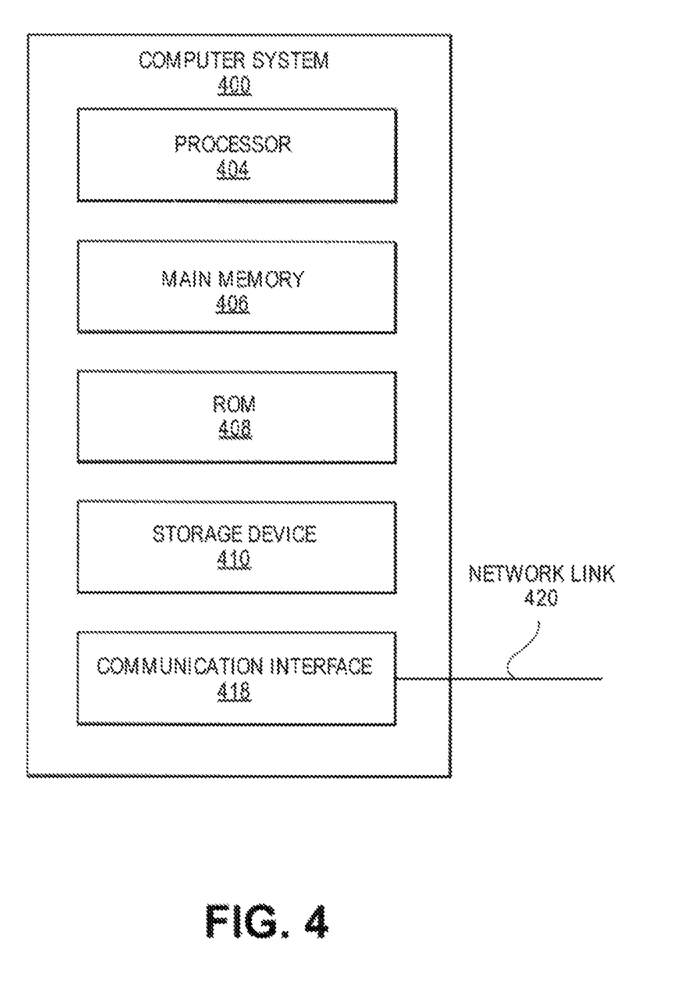
FIG. 4 is a block diagram that illustrates a computer system upon which an embodiment of the invention may be implemented.

In an embodiment, a virtual Converged Cable Access Platform (CCAP) which implements the steps of one or more of FIG. 2 and FIG. 3 may be executed by a computer system. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in storing instructions which may be provided to processor 404 for execution. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that stores one or more sequences of instructions for performing DOCSIS data forwarding functions, which when executed, cause:

classifying one or more packets, of a plurality of received packets, to a particular DOCSIS system component; and processing the one or more packets classified to the same DOCSIS system component on a single physical CPU core of a multiple physical CPU core hardware device, wherein said one or more packets classified to the same DOCSIS system component are restricted from executing on any of said multiple physical CPU cores but said single physical CPU core.

2. The non-transitory computer-readable storage medium of claim 1, wherein the one or more packets classified to the same DOCSIS system component are forwarded between a sequence of one or more software stages which are each executed on the single physical CPU core.

3. The non-transitory computer-readable storage medium of claim 2, wherein at least one of the one or more software stages is implemented by a single operating system thread.

4. The non-transitory computer-readable storage medium of claim 1, wherein the plurality of received packets are distributed in a load-balancing manner amongst a set of entities responsible for classifying the plurality of received packets to a particular DOCSIS system component.

5. The non-transitory computer-readable storage medium of claim 4, wherein execution of the one or more sequences of instructions further cause:

after an operational stage in which the plurality of received packets are distributed in a load-balancing manner amongst a set of entities responsible for classifying the plurality of received packets to a particular DOCSIS system component, the set of entities classifying the one or more packets to a particular DOCSIS system component in a classification stage.

6. The non-transitory computer-readable storage medium of claim 5, wherein the classification stage forwards the one or more packets to a separate encryption stage for DOCSIS encryption.

7. The non-transitory computer-readable storage medium of claim 6, wherein the classification stage forwards the one or more packets for the same DOCSIS service flow to the same encryption stage.

8. The non-transitory computer-readable storage medium of claim 1, wherein the one or more packets classified to the same DOCSIS system component are forwarded between a sequence of one or more software stages, and wherein a separate traffic management stage enqueues downstream packets and schedules the downstream packets for transmission.

9. The non-transitory computer-readable storage medium of claim 1, wherein all packets classified to a DOCSIS service flow in the same DOCSIS mac-domain are processed by the same instance of a traffic management stage.

10. The non-transitory computer-readable storage medium of claim 9, wherein all packets classified to a DOCSIS service flow in the same DOCSIS downstream mac-domain downstream service group are processed by the same instance of a traffic management stage.

11. The non-transitory computer-readable storage medium of claim 1, wherein the one or more packets classified to the same DOCSIS system component are forwarded between a sequence of one or more software stages that each be configured to execute on separate logical cores or on a single logical core.

12. The non-transitory computer-readable storage medium of claim 1, wherein the plurality of received packets are downstream packets.

13. The non-transitory computer-readable storage medium of claim 1, wherein the plurality of received packets are upstream packets.

14. The non-transitory computer-readable storage medium of claim 1, wherein the plurality of received packets are upstream packets, and wherein the one or more packets classified to the same DOCSIS system component are forwarded between a sequence of one or more software stages which are each executed on the single physical CPU core.

15. The non-transitory computer-readable storage medium of claim 14, wherein execution of the one or more sequences of instructions further cause:
assigning a DOCSIS component to a processing stage, of said sequence of one or more software stages, includes assigning a DOCSIS L2TPv3 Control Connection Endpoint (LCCE) to an instance of an Upstream Medium Access Control (UsMac) stage.

16. The non-transitory computer-readable storage medium of claim 14, wherein execution of the one or more sequences of instructions further cause:
assigning a DOCSIS component to a processing stage, of said sequence of one or more software stages, includes assigning a DOCSIS service flow to an instance of an Upstream Packet Processor (USPP) stage.

17. An apparatus for performing DOCSIS data forwarding functions, comprising:
one or more processors; and
one or more non-transitory computer-readable storage medium storing one or more sequences of instructions, which when executed, cause:
classifying one or more packets, of a plurality of received packets, to a particular DOCSIS system component; and
processing the one or more packets classified to the same DOCSIS system component on a single physical CPU core of a multiple physical CPU core hardware device, wherein said one or more packets classified to the same DOCSIS system component are restricted from executing on any of said multiple physical CPU cores but said single physical CPU core.

18. The apparatus of claim 17, wherein the one or more packets classified to the same DOCSIS system component are forwarded between a sequence of one or more software stages which are each executed on the single physical CPU core.

19. A method for performing DOCSIS data forwarding functions, comprising:
classifying one or more packets, of a plurality of received packets, to a particular DOCSIS system component; and
processing the one or more packets classified to the same DOCSIS system component on a single CPU core of a multiple physical CPU core hardware device, wherein said one or more packets classified to the same DOCSIS system component are restricted from executing on any of said multiple physical CPU cores but said single physical CPU core.

20. The method of claim 19, wherein the one or more packets classified to the same DOCSIS system component are forwarded between a sequence of one or more software stages which are each executed on the single physical CPU core.

* * * * *